United States Patent [19]
Curtis et al.

[11] 3,733,502
[45] May 15, 1973

[54] LIQUID COOLED ROTOR FOR DYNAMOELECTRIC MACHINES

[75] Inventors: L. Paul Curtis, Murrysville; Sui-Chun Ying; James E. Luzader, both of Monroeville, all of Pa.

[73] Assignee: Westinghouse Electric Corporation, Pittsburgh, Pa.

[22] Filed: May 17, 1971

[21] Appl. No.: 144,050

[52] U.S. Cl. ................................................. 310/61
[51] Int. Cl. ............................................. H02k 9/00
[58] Field of Search ................... 310/52, 54, 58, 61, 310/64, 65

[56] References Cited

UNITED STATES PATENTS

| | | | |
|---|---|---|---|
| 3,457,440 | 7/1969 | Horsley | 310/52 |
| 3,543,062 | 11/1970 | Banchieri | 310/54 |
| 3,353,043 | 11/1967 | Albright | 310/61 |
| 3,359,438 | 12/1967 | Hylen | 310/52 |
| 3,393,333 | 7/1968 | Kudlacik | 310/61 |
| 3,145,314 | 8/1964 | Becker | 310/61 |
| 3,131,321 | 4/1964 | Gibbs | 310/64 |

Primary Examiner—R. Skudy
Attorney—A. T. Stratton and F. P. Lyle

[57] ABSTRACT

A liquid cooled rotor for dynamoelectric machines such as large turbine generators in which a coolant liquid is introduced along the shaft axis at one end of the machine, flows through passages in the shaft and rotor body, through passages or ducts in the rotor winding, and is discharged through the shaft axis. The leads to the rotor winding are disposed axially in a center bore of the shaft and provision is made for directing the coolant from the shaft axis to an annular passage around the axial leads to cool the leads as well as to carry the coolant to the central or body part of the rotor. Provisions are also made for liquid cooling of the radial leads to the rotor winding, and corrosion resistant linings are utilized in the coolant passages with provision for permitting thermal expansion of the linings.

15 Claims, 7 Drawing Figures

LIQUID COOLED ROTOR FOR DYNAMOELECTRIC MACHINES

BACKGROUND OF THE INVENTION

The present invention relates to the cooling of dynamoelectric machines, and more particularly to a liquid cooled rotor for machines of large size such as turbine generators.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size. The coolant used in these machines has usually been hydrogen, which fills the gas-tight housing and is circulated by a blower on the rotor shaft through the ducts of the stator and rotor windings and through radial or axial ducts in the stator core.

The maximum ratings required in large generators have continued to increase, however, making it necessary to further improve the cooling of these machines in the largest sizes. A substantial improvement in cooling can be obtained by the use of more efficient coolant fluids such as liquids. This has been done in stators by circulating a liquid coolant such as water through the ducts of the stator winding, and a substantial improvement in cooling has thus been obtained. A substantial further improvement can be obtained by applying liquid cooling to the stator by circulation of a suitable liquid such as water through passages in the rotor windings.

Many problems are involved, however, in circulating a liquid coolant through the rotor of a large generator. One of the most difficult and fundamental problems is that of introducing liquid into and discharging it from a rotor of large diameter rotating at high speed, usually 3600 rpm. Since the pressure in the liquid varies with the square of the radius, very high pressure will occur in fluid passages near the periphery of the rotor and the provision of suitable seals for inlet or discharge ports at the periphery is very difficult because of the high surface speed. It is not practical, therefore, to introduce the liquid at or near the surface of the rotor and it is preferably introduced at the smallest possible radius which means as close as possible to the axis. One end of the rotor shaft is usually directly coupled to a turbine shaft to be driven thereby and is not accessible for introduction of liquid at the axis of the shaft. At the other end of the machine, however, the rotor shaft is usually coupled to one end of an exciter shaft and the other end of the exciter shaft is normally accessible for the introduction of liquid. In the usual practice the shafts of both the exciter and the rotor are provided with central bores extending axially therethrough and these bores provide convenient locations for the entrance of coolant liquid.

The liquid can thus readily be introduced at the outer or free end of the exciter shaft but in most cases the rotor shaft bore is largely occupied by the field leads, which are relatively large in machine of the sizes with which the invention is primarily concerned and which are carried into the machine in the shaft bore. Provision must therefore be made for passage of the coolant liquid through the bore of the rotor shaft notwithstanding the presence of the leads therein, and preferably in a manner to cool the leads. A corrosion resistant lining must be provided for all passages and other surfaces exposed to the liquid and this requires provision for minimizing or avoiding undue stresses due to differential thermal expansion of the material of the lining. The coolant liquid must also be directed from the bore of the shaft to the peripheral surface of the rotor and into the passages of the rotor winding, and must then be suitably removed and discharged from the rotor after passage through the windings. All of these as well as other problems are involved in the design of a practical and satisfactory water cooled rotor. Various proposals have been made heretofore for the construction of such rotors, as shown by such illustrative prior art as the U.S. Pats. to Gibbs et al. No. 3,131,321; Horsley No. 3,457,440; and Cuny et al. No. 3,497,736, for example, but no completely satisfactory solution to the above discussed problems has been available heretofore.

SUMMARY OF THE INVENTION

The present invention provides a liquid cooled rotor for large dynamoelectric machines which overcomes the problems discussed above and provides a practical and highly satisfactory construction. In accordance with the invention the liquid coolant, which is preferably water, is introduced through the central bore of the exciter shaft and flows axially through a tube of corrosion resistant material, preferably stainless steel, disposed on the axis of the exciter shaft. As explained previously, the bore of the rotor shaft is substantially occupied by the relatively large field leads, which are disposed as close to the axis of the rotor as possible to minimize magnetic flux in the rotor shaft, and the coolant liquid is conveyed through the shaft portion of the rotor in an annular passage formed by two concentric, corrosion resistant tubes which surround the leads in the shaft bore. The use of this annular passage makes it possible to maintain the necessary flow of coolant through the shaft and also provides effective cooling for the leads themselves to maintain satisfactory temperature of the leads. The tube through which liquid flows in the exciter shaft is connected to the annular passage in the rotor shaft by a coupling member which is designed in such a manner that the liquid flows from the tube into the annular passage with minimum loss.

At the inner end of the rotor shaft adjacent the rotor body the liquid flows through radial tubes from the annular passage to the surface of the rotor and into an annular distribution chamber from which it is directed through suitable ducts or tubes to the rotor winding. The liquid is also used to cool the radial leads which connect the axial leads in the shaft bore to the rotor winding, since these leads carry heavy currents and are in a position where it is difficult to cool them otherwise. The liquid flows through the rotor windings and is discharged at the other end of the machine into a similar annular chamber and through radial passages to the shaft bore at the opposite end of the rotor from which it is discharged in any suitable manner. Thus a construction is provided which accomplishes the desired purpose of circulating coolant liquid through a very large high speed rotor in a very effective manner and which effectively overcomes the problems discussed above.

BRIEF DESCRIPTION OF THE DRAWINGS

The invention will be more fully understood from the following detailed description of an illustrative embodiment, taken in connection with the accompanying drawings, in which.

DESCRIPTION OF THE PREFERRED EMBODIMENT

Figure 1:
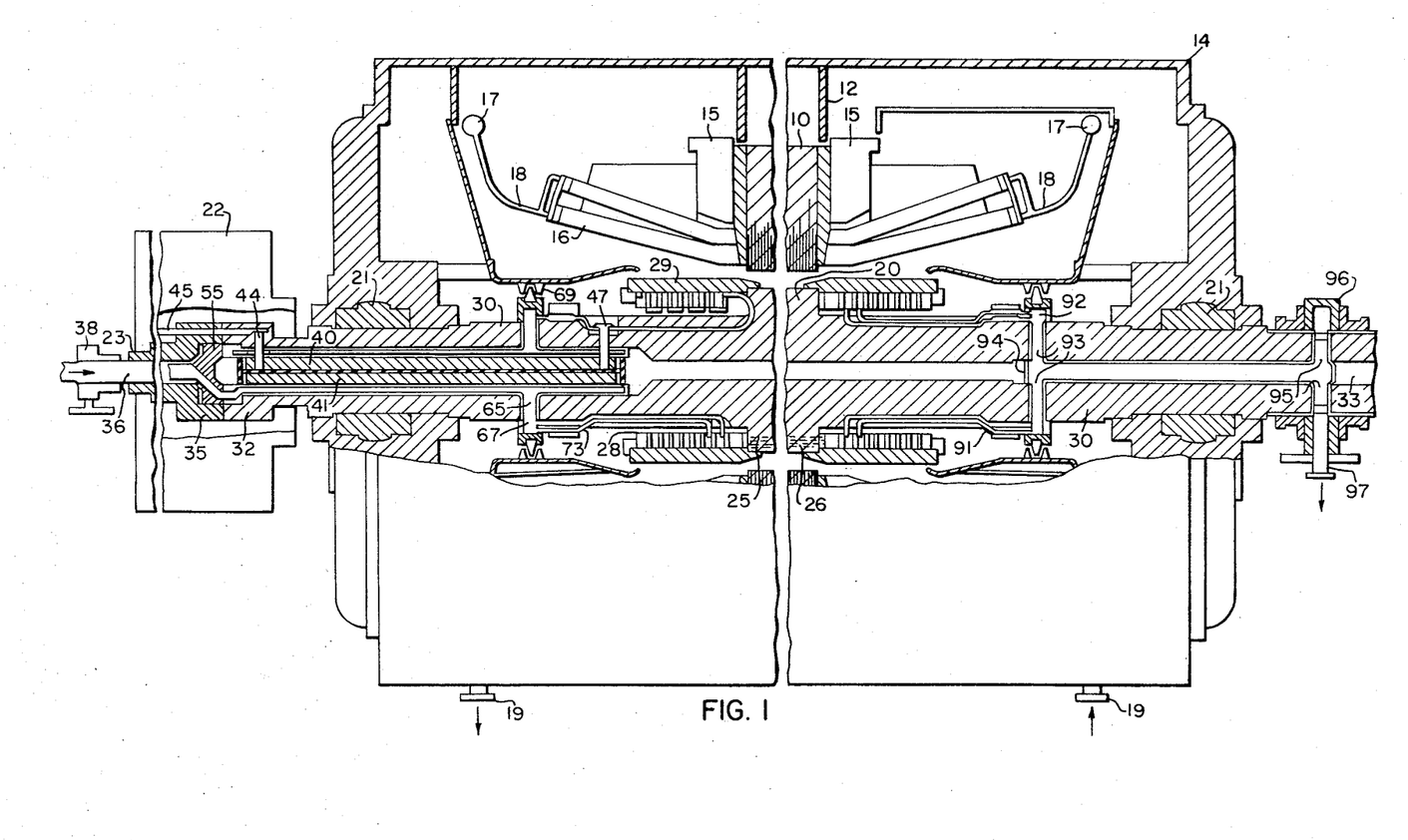
FIG. 1 is a view in longitudinal section, and partly in elevation, of a turbine generator having a liquid cooled rotor embodying the invention.

Referring first to FIG. 1 of the drawing, the invention is shown embodied in a large turbine generator of typical construction although it should be understood that the rotor of the present invention may be used in any desired type of dynamoelectric machine.

As shown, the generator has a stator core 10 supported by frame rings 12 in a substantially gas-tight outer housing 14. The stator core 10 is of the usual laminated construction, having a generally cylindrical bore therethrough, and the laminations are clamped between suitable end plates 15 in the usual manner. The stator core 10 has longitudinal slots in its inner periphery for the reception of a stator winding 16 which may be of any suitable type but which is shown as being a liquid cooled winding. For this purpose circular inlet and discharge manifolds 17 are provided at opposite ends of the machine and connected through suitable means, generally indicated at 18, to circulate a coolant liquid such as water through the coils of the stator winding 16. The manifolds 17 may be connected as indicated diagrammatically at 19 to an external recirculating system of any desired type. The construction of a liquid cooled stator suitable for use with the present invention is disclosed and claimed in a copending application of F. P. Fidei, Ser. No. 31,296, filed Apr. 23, 1970, now U.S. Pat. No. 3,634,705 and assigned to the assignee of the present invention, although other suitable constructions might also be used. The housing 14 is filled with a coolant gas, preferably hydrogen, which is circulated through the interior of the housing to cool the stator core by flow through the usual radial cooling ducts, and suitable baffling of any desired type may be provided in the housing to direct the flow of gas therein.

The machine has a rotor member 20 which is disposed in the bore of the stator core 10 and supported in bearings 21 in the ends of the housing 14. The bearing assemblies preferably include gland seals to prevent leakage of gas along the rotor shaft. The bearings and gland seals may be of any suitable or usual construction and have not been illustrated in detail as they are not a part of the invention. Field excitation for the generator is provided by an exciter 22 disposed at one end of the machine. The exciter 22 may for example be a brushless exciter or it may be of any desired type which is capable of supplying the required direct current field excitation to the generator. The exciter 22 is contained in a housing and has a shaft 23 supported in bearings in the exciter housing.

Figures 2, 5:
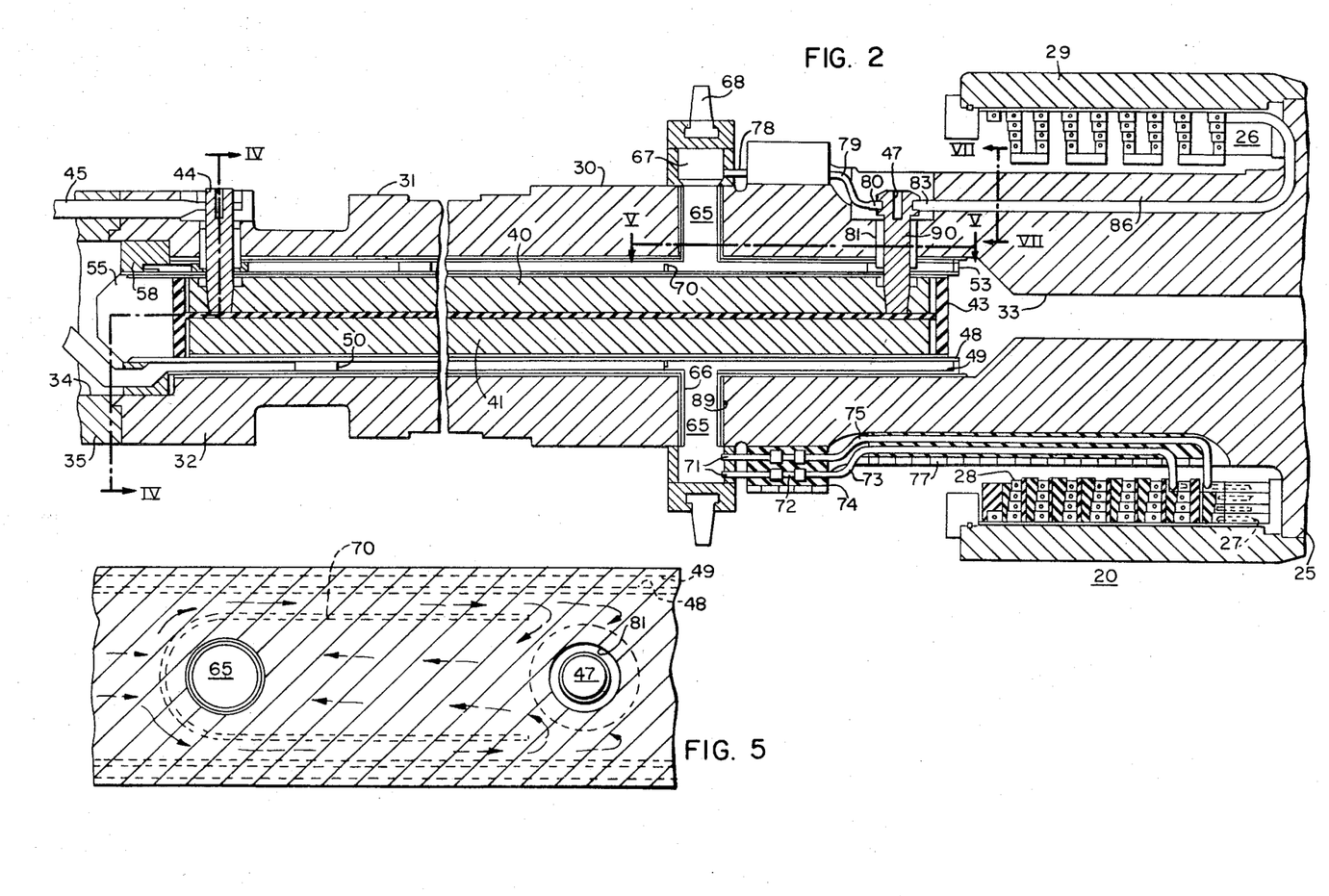
FIG. 2 is a view in longitudinal section on a larger scale of one end of the rotor of FIG. 1, and particularly the shaft portion thereof.
FIG. 5 is a fragmentary plan view showing a portion of the annular coolant passage taken substantially on the line V—V of FIG. 2.

As shown in FIGS. 1 and 2, the rotor member 20 has a central body portion 25 which is provided with peripheral slots in the usual manner for the reception of a rotor winding 26. The rotor winding 26, which constitutes the field winding of the generator, may be arranged in any suitable manner in the slots of the rotor to form the desired number of magnetic poles, usually either two or four in machines of this type. The winding is constituted of copper conductors 27 which extend longitudinally through the slots of the rotor body and generally circumferentially in the end turn portions 28, which lie beyond the ends of the body portion 25 of the rotor and which are supported against rotational forces by heavy retaining rings 29 in the usual manner. As can be seen in the end turn portions 28 which are visible in FIG. 2, the conductors of which the winding is composed are hollow with central passages extending through them through which the coolant liquid flows from one end to the other. Any suitable or desired type of flow pattern may be utilized and any desired type of electrical circuit may be used.

The rotor 20 has shaft portions 30 integral therewith extending axially from each end of the body portion 25. The shaft portion 30 at the lefthand end of the rotor as viewed in the drawings has a journal portion 31, which is supported in the bearing 21, and terminates in a coupling flange portion 32. The shaft portion 30 has a central axially extending bore 33 which in accordance with usual practice may extend for the entire length of the rotor from one end to the other. The shaft portion 30 at the other end of the rotor may be of generally similar construction and has not been shown in detail. The exciter shaft 23 also has a central bore 34 extending axially therethrough and terminates in a coupling flange portion 35 as clearly shown in FIGS. 1, 2 and 3. The coolant fluid, which is preferably water, is introduced into the rotor through the bore 34 of the exciter shaft 23, since in this way it can be introduced at the point of minimum radius which requires the lowest entrance pressure and simplifies the sealing problem. In order to protect the steel exciter shaft 23 from corrosion, a liner or tube 36 of corrosion resistant material is disposed coaxially in the bore 34. The tube 36 is preferably made of stainless steel and is supported in the bore 34 with a slight clearance, preferably on spacer or support elements 37 of a material such as Teflon (polytetrafluoroethylene) which permits ready sliding movement of the tube relative to the shaft. The water is introduced into the tube 36 at the outer end of the shaft 23, sealing means 38 of any suitable type being provided.

Figure 3:
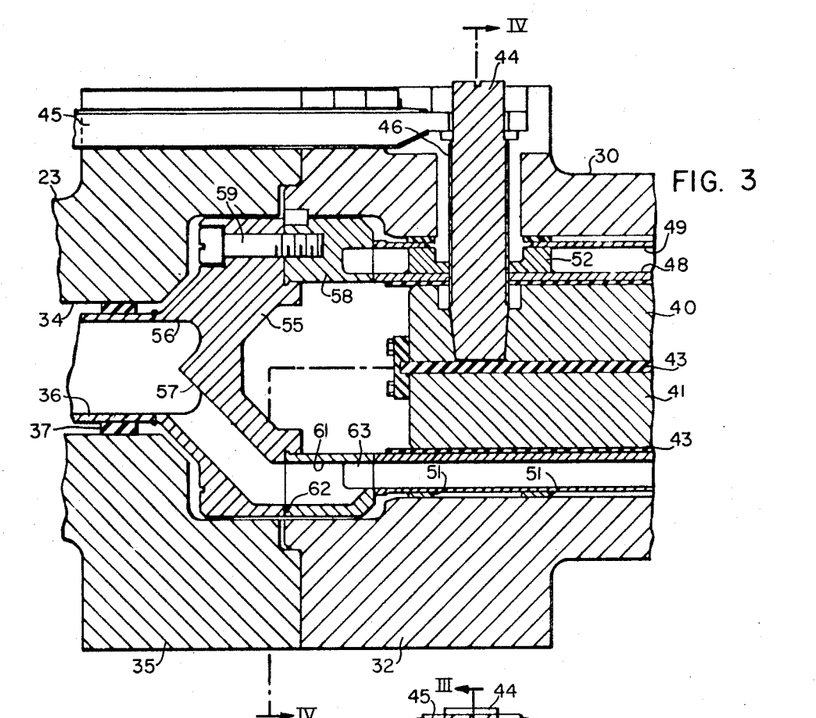
FIG. 3 is a longitudinal sectional view of a coupling assembly between the exciter shaft and the rotor shaft, the view being taken substantially on the line III—III of FIG. 4.
Figure 4:
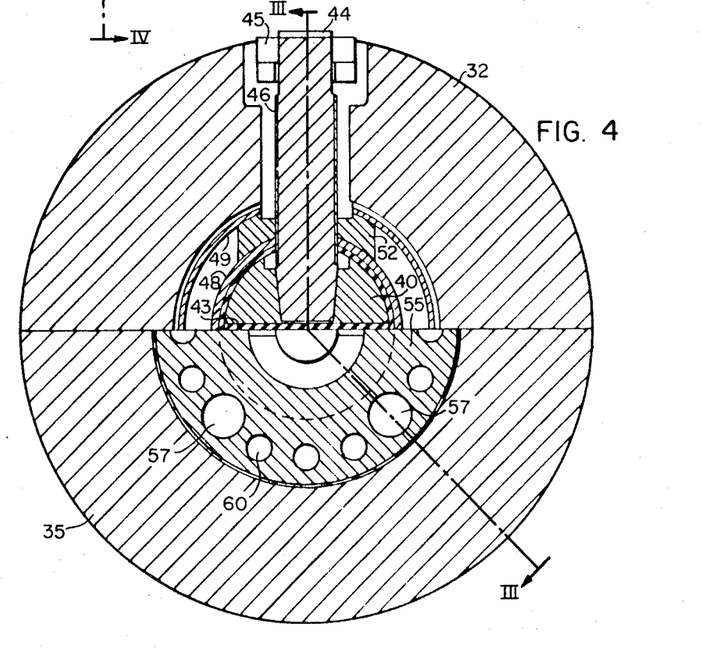
FIG. 4 is a transverse sectional view substantially on the line IV—IV of FIG. 3.

As previously mentioned, the rotor has a central bore 33 which extends axially from one end of the rotor to the other. Axial leads 40 and 41 extend through the bore 33 in the shaft portion at the lefthand end of the rotor as seen in FIGS. 2 and 3. Since these leads carry the large field current of the generator, they are necessarily of relatively large size and they are placed in the bore as close to the shaft axis as possible, and as close to each other as possible, to minimize the magnetic flux produced in the shaft portion of the rotor by the heavy field currents. As seen in FIG. 4, the leads 40 and 41 are substantially semicircular in cross section and are separated from each other and insulated from the shaft by insulating material 43. A radial lead 44 extends through the rotor shaft at or near the coupling flange 32 and is threaded into the lead 40. The lead 44 may be connected in any suitable manner to a lead 45 from the exciter 22. The radial lead 44 may be a heavy copper stud encased in an insulating sheath 46 and threaded into the lead 40. A generally similar radial lead 47 is provided at the other end of the lead 40, adjacent the rotor body, and is connected to the rotor winding in a manner more fully described hereinafter. It will be understood that similar radial leads are provided for the other axial lead 41 but they have been omitted from the drawing in order to simplify it.

The liquid coolant which is introduced into the rotor through the exciter shaft bore 34 must flow through the bore 33 of the rotor shaft portion 30 to reach the rotor winding. The heavy leads 40 and 41 occupy most of the bore area in the shaft portion of the rotor, but there is sufficient room without making the bore excessively large to accommodate the necessary flow of coolant for the desired cooling effect, and this coolant can also be used to cool the leads themselves which generate a substantial amount of heat as a result of the heavy field currents which they carry. The cooling of the axial leads however, must be done in such a manner as to maintain nearly uniform temperature in order to avoid stresses due to uneven thermal expansion, and for this reason an annular passage is provided for the coolant which completely surrounds the axial leads. This passage is formed by two tubes 48 and 49 which are disposed concentrically about the leads within the shaft bore and which are spaced apart radially a sufficient distance to form an annular passage of the desired area for the flow of coolant. Since this passage entirely surrounds the leads 40 and 41 and is completely filled with the cooling water, uniform cooling and uniform temperature of the leads are assured. The tubes 48 and 49 are made of stainless steel or other suitable corrosion resistant material. The inner tube 48 snugly surrounds and supports the leads 40 and 41, being separated from them by the insulating cover 43, while the outer tube 49 forms the outer wall of the annular passage and protects the steel rotor shaft from corrosion by the water. The tubes 48 and 49 may be supported and spaced apart in any suitable manner, as by spacers 50 between the tubes, and the outer tube 49 may be supported in the bore on spacers or supports 51 of Teflon to permit axial sliding of the tube. The radial lead 44 passes through the annular passage in a metal collar 52 which is welded or otherwise secured in the passage so as to seal the opening around the lead against the escape of water. Any other or additional sealing means may be used if desired. The other end of the annular passage is closed by an annular member 53 sealed to the ends of the tubes 48 and 49.

The coupling flange portions 32 and 35 are joined together by bolts (not shown) or other suitable means to secure the shafts 30 and 32 rigidly together so that they constitute a unitary shaft assembly or rotor shaft portion. The water entering the exciter shaft 23 passes through the tube 36 on the axis of the shaft and must be directed from the axis of the exciter shaft to the annular passage formed by the tubes 48 and 49 in the bore of the rotor shaft. This could of course be done by a right angle flow of the liquid through radial ducts but such an arrangement, with the relatively small flow passages which would be involved, would necessarily involve relatively high losses. The structure shown in detail in FIGS. 3 and 4 is therefore provided to avoid such losses. This structure includes a coupling member 55 which is made of stainless steel or other suitable corrosion resistant material, preferably the same material as the tubes 36, 48 and 49. The coupling member 55 has a central opening or passage 56 and the tube 36 is welded or otherwise sealed to the coupling 55 in communication with the passage 56. A plurality of axially inclined passages 57 extend from the central passage 56, as shown in FIG. 3, to convey the liquid flowing through the tube 36 to a larger radius corresponding to the position of the annular passage formed by the tubes 48 and 49. Any suitable number of passages 57 may be provided, four being shown in the illustrative embodiment, and the passages are inclined as shown so that they extend both axially and radially to minimize any loss due to change in direction of the fluid flow.

A ring member 58, also of stainless steel, is joined to the coupling member 55 by bolts 59 passing through holes 60 provided in the coupling member 55. A sufficient number of bolts 59 are provided to effect a rigid connection and to seal the ring member 58 to the coupling 55. Passages 61 are provided in the ring member 58 corresponding in number and position to the passages 57, and sealing means such as O-rings 62 are provided to seal the joints between the passages 57 and 61, the sealing pressure being provided by the bolts 59. The passages 61 communicate with an annular recess 63 extending around the ring member 58 and this recess 63 communicates directly with the annular passage between the tubes 48 and 49 which are welded or otherwise secured directly to the ring 58. The liquid coolant passing through the tube 36 is thus directed through the passages 57 and 61 to the annular passage in the rotor shaft bore with minimum loss and flows through the annular passage to the rotor body while cooling the axial leads 40 and 41.

At the other end of the shaft portion 30 near the rotor body portion 25 the coolant liquid flows from the annular passage between the tubes 48 and 49 through two diametrically opposite radial passages 65 in the rotor which extend to the surface of the rotor. The passages 65 are lined with stainless steel tubes 66 which are welded or otherwise secured in the outer tube 49, and the passages 65 communicate with an annular water distribution chamber 67 which extends around the surface of the rotor. The chamber 67 may be an integral chamber welded or otherwise secured to the rotor surface and is preferably also made of stainless steel. Blower blades 68 may be carried on the outer periphery of the chamber 67 and cooperate with stationary blades 69 in the stator member to form an axial flow blower for circulating gas in the housing 14.

The water flowing through the annular passage between the tubes 48 and 49 thus flows outward through the radial passages 65 to the water distributing chamber 67. This water is used, however, before entering the passages 65 to cool the radial lead 47 adjacent the rotor body. It will be understood that the radial lead 44 at the outer end of the rotor shaft does not require special cooling means since its inner end is cooled by liquid flowing in the annular passage and its outer end is accessible to the exciter cooling system. The radial lead 47, however, is enclosed within the generator where it is not accessible and may be of greater length so that additional cooling may be needed for this lead. In order to cause the water flowing in the annular passage to flow around the lead 47 before it enters the radial tube 65, baffles 70 are placed in the annular passage adjacent the entrance to the tube 65 in the manner shown in FIG. 5. These baffles divert the water flowing in the annular passage to flow around the inner end of the lead 47 and then back to the passage 65 as shown by the arrows in FIG. 5. It will be understood that, as previously mentioned, similar radial leads are provided for the axial lead 41 but have been omitted from the drawing for simplicity. The section plane of the lower part of FIGS. 1 and 2 is therefore to be considered as being slightly displaced angularly from the plane of the upper part for this reason and also to more clearly shown the winding end turns 28 and connectors 73.

The water flowing into the distribution chamber 67 is directed therefrom to the conductors 27 of the rotor winding to circulate therethrough. For this purpose a plurality of pipes or conduits 71 extend axially from the distribution chamber 67 and are connected by insulating hoses or couplings 72 to connectors 73 which extend to the individual winding conductors 27. The insulating hoses 72 may be supported on the rotor surface in any suitable manner against the centrifugal forces to which they are subjected. As illustrated, they may be embedded in a mass of suitable molding material 74 and further supported by retaining rings, shrunk or otherwise secured over the assembly to hold them rigidly in place. The connectors 73 extend axially in slots 75 in the rotor surface and are held therein by wedges 77. The connectors 73 may be of any suitable type supported in any suitable manner, one desirable arrangement being shown and claimed in the copending application of S. C. Ying, Ser. No. 170,828 filed Aug. 11, 1971 and assigned to the assignee of the present invention.

Figure 6:
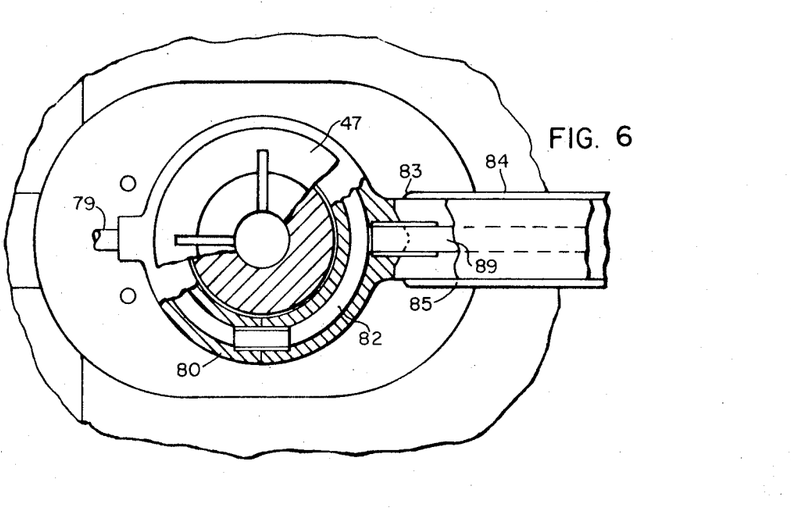
FIG. 6 is a fragmentary view of a portion of the rotor shaft surface showing the top of a radial lead.
Figure 7:
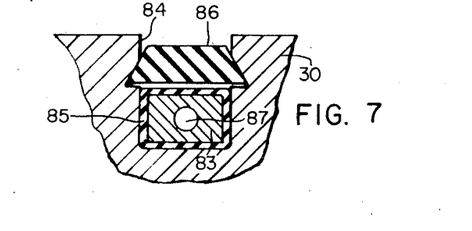
FIG. 7 is a fragmentary sectional view substantially on the line VII—VII of FIG. 2.

Water from the chamber 67 is also utilized to cool the outer end of the radial lead 47 and the winding leads. For this purpose, as shown in FIGS. 2 and 6, a tube 78 extends from the chamber 67 and is connected to a tube 79 by an insulating connection similar to the connectors 72 previously described. The tube 79 is connected to a ring shaped connector 80 which encircles the end of the radial lead 47. The radial lead 47 comprises a heavy copper stud with insulating sleeve 81 thereon which extends through a radial opening in the rotor shaft 30 and is threaded into the axial head 40. The head of the lead 47 is shown as having an annular recess extending around it and the connector 80 is received in this recess and has a central passage 82 for the water from the tube 79. A lead 83 is attached by brazing or otherwise to the annular connector 80 and extends axially through a slot 84 in the rotor surface. The lead 83 is insulated as indicated at 85 and is retained in position in the slot 84 by wedges 86. The lead 83 has a central passage 87 extending through it which communicates with the annular passage 82 in the connector 80. Water from the distribution chamber 67 thus flows through the tubes 78 and 79 to the annular passage 82 where it flows around the top of the radial lead 47 to cool it and then through the central passage 87 of the lead 83. The lead 83 conducts the field current to the rotor winding 27 and is cooled by the liquid flowing through the central passage 87 which then flows into the rotor winding in the same manner as the liquid conveyed by the connectors 73.

As the water flows through the annular passage in the rotor shaft and absorbs heat from the axial leads, its temperature will rise during operation of the machine and the temperature rise of the tubes 48 and 49 may be greater than that of the shaft portion 30. Since these tubes are preferably made of stainless steel which has greater thermal expansivity than the special alloy steel of which the rotor itself is made, provision must be made to allow differential expansion in order to avoid the excessive stress and possible deformations which would occur if the tubes were rigidly clamped in position. A sleeve 89 is disposed in each of the radial passages 65 outside the liners 66 and these sleeves are secured in the outer tube 49, anchoring the outer tube in axial position at that location. A collar 90 surrounds the lead 47 and is secured to the tubes 48 and 49 to seal the annular passage similarly to the collar 52 previously described. The collar 90 provides sufficient clearance around the lead 47 to permit some axial movement of the tubes 48 and 49. The tubes 48 and 49 are free to move longitudinally in the shaft bore 33, except for the anchoring of the tube 49 at one point, and are supported in the shaft bore on the supports 51 as previously described. The tubes 48 and 49, the coupling assembly 55, and the tube 36 are thus free to move longitudinally in the shaft bores to accommodate the differential expansion, the radial lead 44 at the outer end being provided with sufficient clearance in the collar 52 to permit such movement. The problem of differential expansion is therefore overcome in a simple and effective manner by anchoring the complete assembly of coolant tubes at one end only and permitting it to move axially in the shaft bores as required.

The water or other coolant liquid introduced into the rotor windings through the connectors 73 flows through the passages in the winding conductors 27 to the other end of the rotor and is discharged through connectors 91 (FIG. 1) similar to the connectors 73. The connectors 91 are similarly arranged and secured in position and extend axially of the rotor shaft to an annular chamber 92 secured on the surface of the motor. The water entering the chamber 92 escapes through radial passages 93 and into the rotor shaft bore 33 at this end of the rotor, from which it may be discharged in any desired manner. In the illustrated embodiment the bore 33 is blocked adjacent the passages 93 by a partition 94, so that the water flowing radially inward through the passages 93 flows through the bore 33 to other radial passages 95 from which it is discharged into a stationary collecting chamber 96 which encircles the rotor and may be sealed in any suitable manner. The water from the chamber 96 is discharged at 97 for cooling and recirculation or other suitable disposition. The radial passages 93 and 95 and the shaft bore between them are preferably lined with stainless steel liners to protect the rotor from corrosion, any necessary provisions being made for the differential expansion that may occur.

It will now be seen that a water cooled rotor has been provided which overcomes the problems previously discussed. The water is introduced at the axis of the shaft where the pressure is the lowest so that sealing and entrance problems are minimized. Means are provided for facilitating passage of the water from the central axial bore in which it initially flows to an annular passage at a larger radius to permit it to flow around and cool the axial leads which are located in their usual position in the rotor bore. In this way, a very effective construction is provided for introducing the coolant liquid into a liquid cooled rotor with minimum loss and with minimum problems of sealing. The differential expansion problem introduced by the necessity of using a corrosion resistant lining for the water carrying passages is also solved in a simple manner by permitting free axial movement of the tubes and coupling which carry the coolant. Effective cooling of all parts of the rotor which carry current is also provided.

It will be apparent therefore that a very effective construction has been provided for water cooled rotors for large dynamoelectric machines such as turbine generators. A particular embodiment of the invention has been shown and described for the purpose of illustration but it will be understood that various other modifications and embodiments are possible.

We claim as our invention:

1. A rotor member for a dynamoelectric machine, said rotor member having shaft portions and having a body portion carrying windings, said windings having passages for circulation of a liquid coolant therethrough, at least said shaft portions having central bores extending axially therethrough, electrical leads for the windings disposed in the bore of the shaft portion at one end of the rotor member, said leads being solid and extending axially in said bore, an annular passage in said bore closely surrounding said leads for their entire length, means for introducing liquid coolant into said shaft bore beyond the end of the leads, means for directing coolant from the bore into said annular passage to flow therethrough in cooling relation with the leads, means for directing coolant from said annular passage to said winding passages, and means for directing coolant from the winding passages directly to a shaft bore for discharge therefrom.

2. A rotor member as defined in claim 1 in which the means for directing coolant from the shaft bore to the annular passage comprises a member having a central passage communicating with the bore and a plurality of passages inclined to the shaft axis and extending both radially and axially from the central passage, said inclined passages communicating with the annular passage.

3. A rotor member as defined in claim 1 in which the shaft portion at said one end of the rotor member includes a portion integral with the body portion and a separate portion coaxial therewith, said electrical leads and annular passage extending substantially to the end of the integral shaft portion, means for rigidly coupling together the integral and separate shaft portions, means for introducing liquid coolant into the bore of the separate shaft portion, and a coupling member disposed within said coupling means, said coupling member having a central passage communicating with the bore of the separate shaft portion and a plurality of passages inclined to the shaft axis and extending both axially and radially from said central passage, said inclined passages communicating with said annular passage.

4. A rotor member as defined in claim 3 in which the bore of the separate shaft portion contains a tube connected to said coupling member and the annular passage is defined by two concentric tubes connected to the coupling member, said tubes and said coupling member made of a corrosion-resistant material.

5. A rotor member as defined in claim 1 having radial leads adjacent each end of said axial leads, each of said radial leads extending radially of the shaft portion from the outer surface thereof into an axial lead to make electrical connection thereto, the radial leads adjacent the body portion of the rotor extending through said annular passage, baffle means in he annular passage to effect circulation of coolant around the radial leads, and means for making electrical connection between said radial leads and said winding.

6. A rotor winding as defined in claim 1 having radial leads adjacent each end of said axial leads, each of said radial leads extending radially of the shaft portion from the outer surface thereof into an axial lead to make electrical connection thereto, the radial leads adjacent the body portion of the rotor extending through said annular passage, radial tubes extending from the annular passage through the shaft portion for carrying coolant to the surface of the shaft portion, means for directing said coolant to said winding passages, means in the annular passage for effecting flow of coolant around the last-mentioned radial leads before entering the radial tubes, and means for making electrical connections between the last-mentioned leads and the windings.

7. A rotor member as defined in claim 6 in which the means for making electrical connections between the radial leads and the windings comprise hollow conductors, and means for directing a part of the liquid coolant to flow through said conductors.

8. A rotor member for a dynamoelectric machine, said rotor member having shaft portions and having a body portion carrying windings, said windings having passages for circulation of a liquid coolant therethrough, at least said shaft portions having central bores extending axially therethrough, electrical leads for said windings extending axially in the bore of the shaft portion at one end of the rotor, a pair of tubes disposed concentrically in the bore at said one end of the rotor, said tubes closely surrounding said leads and defining an annular passage between them for flow of liquid in cooling relation with the leads, another tube disposed centrally in the shaft bore beyond the leads, means connecting the last-mentioned tube to said concentric tubes, means for introducing a liquid coolant into the centrally disposed tube, and means for directing liquid from said annular passage to the passage in the windings, all of said tubes and said connecting means being made of a corrosion-resistant material.

9. A rotor member as defined in claim 8 in which the tubes and connecting means are made of stainless steel.

10. A rotor member as defined in claim 8 in which the concentric tubes are secured in axial position adjacent the body portion of the rotor and the concentric tubes, centrally disposed tube and connecting means are otherwise free to move axially in the shaft bore.

11. A rotor member for a dynamoelectric machine, said rotor member having a body portion carrying windings and having shaft portions at each end of the body portion, at least the shaft portion at one end of the rotor having a central bore extending axially therethrough, electrical leads for said windings disposed in said shaft bore and extending axially therethrough substantially to the end of the shaft portion, a pair of concentric tubes disposed in the shaft bore around said leads, said tubes being substantially coextensive with the leads and forming an annular passage between them closely surrounding the leads, a separate shaft portion coaxial with the first-mentioned shaft portion and having a central bore, means for rigidly coupling said shaft portions together, a tube centrally disposed in the bore of the separate shaft portion, a coupling member within said coupling means, said coupling member having a central passage connected to said centrally disposed tube and having a plurality of passages extending outwardly from the central passage at an acute angle to the shaft axis and communicating with said annular passage, means for introducing liquid coolant into said centrally disposed tube to flow therethrough and through the annular passage in cooling relation with the leads, and means for directing the coolant from the annular passage to said winding passages.

12. A rotor member as defined in claim 11 in which the tubes and coupling member are made of a corrosion-resistant material.

13. A rotor member as defined in claim 11 in which the concentric tubes are secured in position at a location adjacent the body portion of the rotor and the concentric tubes, the centrally disposed tubes and the coupling member are free to move together axially of the shaft bores.

14. A rotor member as defined in claim 11 in which the means for directing coolant from the annular passage comprises tubes extending radially from the annular passage to the surface of the rotor member, a circular chamber extending around the rotor member and communicating with said radial tubes, means for connecting the circular chamber to said winding passages, and means for securing the concentric tubes in axial position adjacent the rotor body, the tubes and the coupling member being otherwise free to move together axially of the shaft bores.

15. A rotor member as defined in claim 14 in which all the tubes and the coupling member are made of a corrosion-resistant material.

* * * * *